No. 785,959. PATENTED MAR. 28, 1905.
R. LAASS.
SULKY SHAFT.
APPLICATION FILED MAR. 12, 1904.
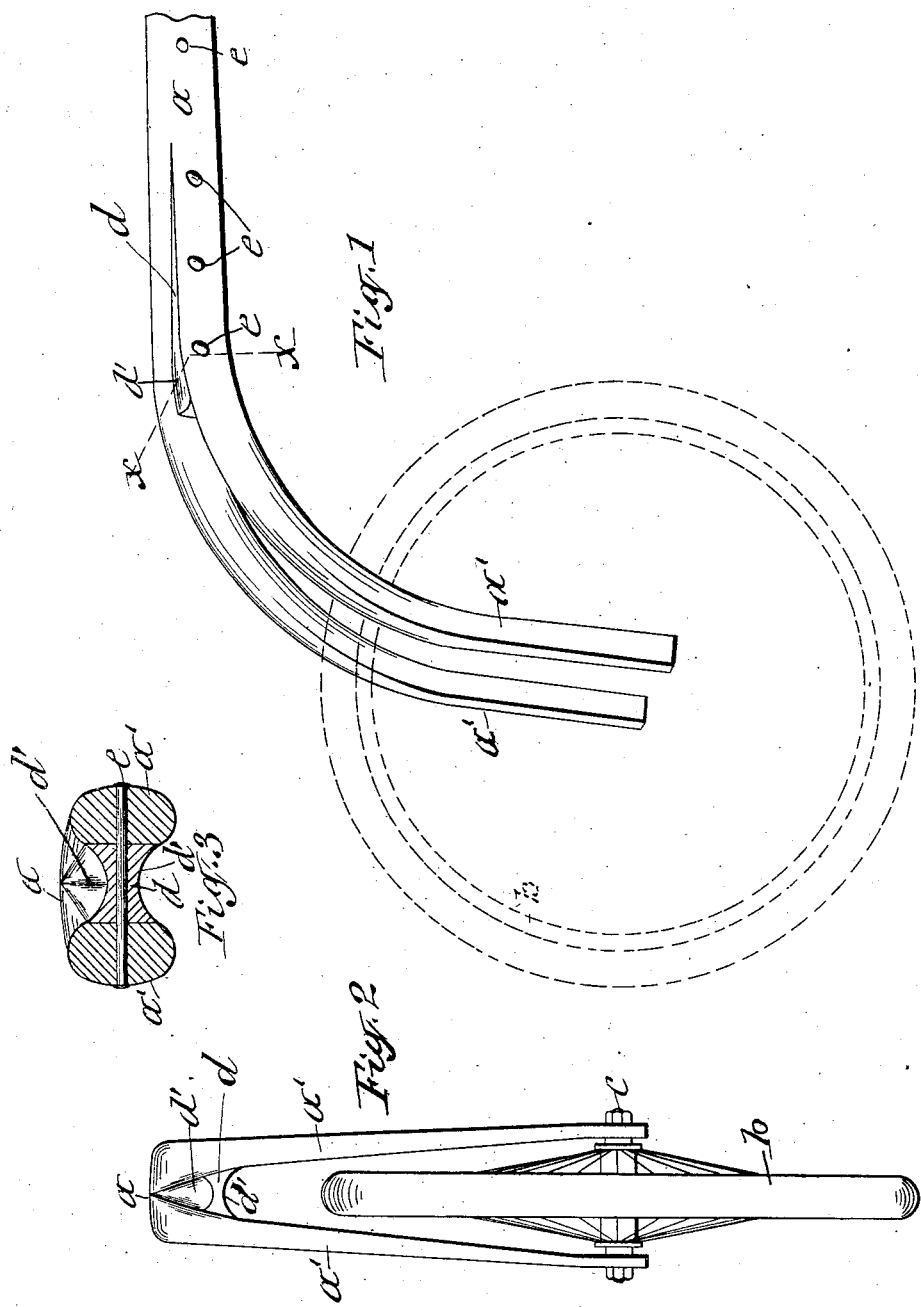
WITNESSES.
L. H. Fulmer.
J. J. Laass.
INVENTOR
Robert Laass
By E. Laass
ATTORNEY.

No. 785,959. Patented March 28, 1905.

UNITED STATES PATENT OFFICE.

ROBERT LAASS, OF LYONS, NEW YORK.

SULKY-SHAFT.

SPECIFICATION forming part of Letters Patent No. 785,959, dated March 28, 1905.

Application filed March 12, 1904. Serial No. 197,783.

*To all whom it may concern:*

Be it known that I, ROBERT LAASS, of Lyons, in the county of Wayne, in the State of New York, have invented new and useful Improvements in Sulky-Shafts, of which the following, taken in connection with the accompanying drawings, is a full, clear, and exact description.

This invention relates to the species of sulky-shafts which are bifurcated at their rear ends, each of said shafts having its bifurcated end straddling one of the wheels and connected to the axle thereof.

The object of this invention is to provide a bifurcated sulky-shaft which shall be simple and inexpensive to manufacture and serve to thoroughly brace the wheel in a position to maintain the tread thereof in range with the longitudinal central line of the shaft and at the same time equalize the lateral strain of the shaft in opposite directions thereof and also effectually prevent splitting of the shaft incident to said lateral strain; and to that end the invention consists specifically in the improved construction and combination of parts hereinafter described and as illustrated in the annexed drawings, in which—

Figure 1 is a side view of the rear end portion of my improved sulky-shaft, shown partly in perspective. Fig. 2 is a rear end view of said sulky-shaft in connection with one of the sulky-wheels, and Fig. 3 is an enlarged transverse section on the line $x$ $x$ in Fig. 1.

$a$ denotes one of the shafts of a sulky. The rear end portion is split longitudinally to form two arms $a'$ $a'$ of the bifurcation of the shaft. These arms are bent downward and spread apart to receive between them one of the sulky-wheels $b$, to the axle $c$ of which the ends of the arms $a'$ $a'$ are suitably connected.

In order to thoroughly brace the wheel $b$ in a position to maintain the tread thereof in range with the longitudinal center of the shaft $a$ and at the same time equalize the lateral strain of the shaft in opposite directions thereof, as aforesaid, I spread the two arms $a'$ $a'$ at the same angle from the longitudinal central line of the shaft, as shown in Fig. 2 of the drawings. Inasmuch as it is very desirable to have the main portion of the shaft presenting a rounding surface, I form the crotch portion of each arm $a'$ $a'$ oval in cross-section, as shown in Fig. 3 of the drawings, and insert into the crotch a wedge $d$, the sides of which are concaved to correspond to the convexity of the inner sides of the arms. The top and bottom of the said wedge I form with forwardly-vanishing longitudinal grooves $d'$ to prolong the aforesaid desired external shape of the shaft.

Transversely through the arms $a'$ $a'$ and intervening wedge $d$ I pass rivets $e$ $e$, which are fastened to the sides of the shaft and serve to securely confine the wedge in position and retain the arms $a'$ $a'$ in their uniformly-inclined and equally-bracing position.

What I claim as my invention is—

In a sulky having each of its shafts bifurcated and straddling one of the wheels, the shaft having the two arms of its bifurcation spread apart at the same angle from the central longitudinal line of the shaft, and the crotch portion of each arm formed oval in cross-section, a wedge inserted into the crotch of the bifurcation and formed with concaved sides corresponding to the convexity of the shaft-arms and with forwardly-vanishing grooves on top and bottom, and rivets passing transversely through the arms and intervening wedge and retaining the said arms in their uniformly-inclined and equally-bracing position as set forth and shown.

ROBERT LAASS. [L. S.]

Witnesses:
LUTHER S. LAKE,
GEO. FRIND.